US012584050B2

(12) United States Patent
Kusunoki et al.

(10) Patent No.: US 12,584,050 B2
(45) Date of Patent: Mar. 24, 2026

(54) ADHESIVE COMPOSITION AND FILM-SHAPED SEALING MATERIAL

(71) Applicant: SHIN-ETSU CHEMICAL CO., LTD., Tokyo (JP)

(72) Inventors: Takayuki Kusunoki, Annaka (JP); Masao Ando, Joetsu (JP); Nobuhiro Ichiroku, Annaka (JP); Hideo Nakagawa, Omihachiman (JP); Atsushi Wakamiya, Kyoto (JP); Yuko Matsushige, Kyoto (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 320 days.

(21) Appl. No.: 18/237,950

(22) Filed: Aug. 25, 2023

(65) Prior Publication Data

US 2024/0117226 A1 Apr. 11, 2024

(30) Foreign Application Priority Data

Sep. 1, 2022 (JP) ................................ 2022-139263

(51) Int. Cl.

| | |
|---|---|
| ***C08F 2/46*** | (2006.01) |
| ***C08F 2/50*** | (2006.01) |
| ***C08G 61/04*** | (2006.01) |
| ***C09J 11/06*** | (2006.01) |
| ***C09J 163/10*** | (2006.01) |

(52) U.S. Cl.

CPC ............. *C09J 163/10* (2013.01); *C09J 11/06* (2013.01); *C09J 2301/312* (2020.08); *C09J 2301/408* (2020.08)

(58) Field of Classification Search

CPC ............... C08F 2/46; C08F 2/50; C08G 61/04
USPC ....................... 522/6, 71, 189, 184, 1; 520/1
See application file for complete search history.

(56) References Cited

U.S. PATENT DOCUMENTS

2008/0255283 A1 10/2008 Aoki et al.
2019/0112469 A1 4/2019 Yoshiwara et al.

FOREIGN PATENT DOCUMENTS

JP 2008189833 A * 8/2008
JP 2021-089946 A 6/2021
WO 2017/169985 A1 10/2017

OTHER PUBLICATIONS

Aoki et al, JP 2008189833 Machine Translation, Aug. 21, 2008 (Year: 2008).*

Apr. 15, 2025 Intention to Grant Patent issued in European Patent Application No. 23193659.2.
Nov. 8, 2023 Extended Search Report issued in European Patent Application No. 23193659.2.

* cited by examiner

*Primary Examiner* — Jessica Whiteley
(74) *Attorney, Agent, or Firm* — Oliff PLC

(57) ABSTRACT

An adhesive composition, including: a reaction product (A) among a bifunctional epoxy resin represented by the formula (2), a tri- or more functional epoxy resin represented by the formula (3), and a saturated acid anhydride represented by the following general formula (4); a UV-sensitive reaction initiator (B); and a dilution solvent (C), wherein the component (A) is a compound represented by the formula (1), a ratio of a total mole of epoxy groups in the multi-functional epoxy resin to a mole of the saturated acid anhydride is 1.30 to 3.00, and a mole of the bifunctional epoxy resin relative to a total mole of the multi-functional epoxy resin is 0.001 to 0.15. This provides a highly reliable epoxy-resin-based adhesive composition and film-shaped sealing material having a low viscosity, curability at low temperature, and high adhesiveness, and retaining power generation performance of a perovskite solar cell before and after sealing.

(1)

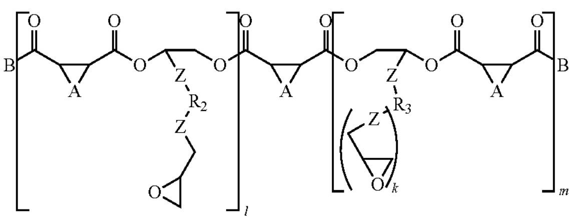

(2)

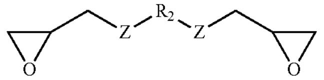

(3)

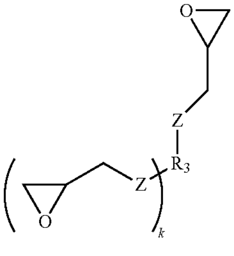

(4)

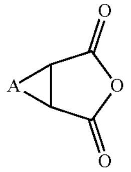

10 Claims, No Drawings

ADHESIVE COMPOSITION AND FILM-SHAPED SEALING MATERIAL

TECHNICAL FIELD

The present invention relates to an adhesive composition and a film-shaped sealing material.

BACKGROUND ART

Demand for renewable energy increasing in recent year has required a transparent solar cell. A perovskite solar cell is a candidate for the transparent solar cell, but with considering commercial use, required is a film-type transparent solar cell that can be applied with a large area to be attached to a wall or window of a building, which differs from a single-crystal or amorphous-silicon solar cell. To achieve such a transparent film-type solar cell, an adhesive with a low viscosity, curability at low temperature, high adhesiveness, and high reliability before and after sealing is required (Patent Document 1).

A conventional adhesive composition composed of an epoxy resin and a saturated hydrocarbon acid anhydride is excellence in the low viscosity and the high transparency, but poor in power generation performance retainability before and after sealing because of difficulty in curing at a low temperature acceptable for the perovskite solar cell. Accordingly, the simple adhesive composition composed of an epoxy resin and a saturated hydrocarbon acid anhydride is uncured and considerably deteriorates the power generation performance, and thereby it cannot be a suitable adhesive composition and film-shaped sealing material for sealing a solar cell.

CITATION LIST

Patent Literature

Patent Document 1: JP 2021-89946 A

SUMMARY OF INVENTION

Technical Problem

The present invention has been made in view of the above circumstances. An object of the present invention is to provide a highly reliable epoxy-resin-based adhesive composition and film-shaped sealing material having a low viscosity, curability at low temperature, and high adhesiveness, and retaining the power generation performance of the perovskite solar cell before and after sealing.

Solution to Problem

To solve the above problem, the present invention provides an adhesive composition, comprising:

- a reaction product (A) among a bifunctional epoxy resin represented by the following general formula (2), a tri- or more functional epoxy resin represented by the following general formula (3), and a saturated acid anhydride represented by the following general formula (4);
- a UV-sensitive reaction initiator (B); and
- a dilution solvent (C), wherein
- the component (A) is a compound represented by the following general formula (1), (1)

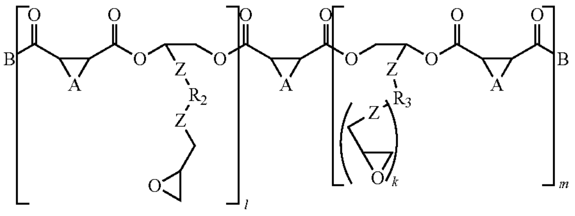

(1a)

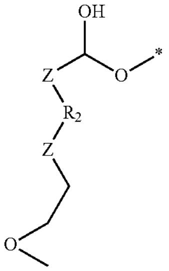

(1b)

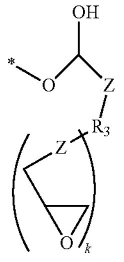

wherein A represents a saturated divalent hydrocarbon group; B each independently represents a group represented by the general formula (1a) or the general formula (1b); $R_2$ represents a substituted or unsubstituted divalent organic group having an aliphatic hydrocarbon group, an aromatic ring, or a heteroring; $R_3$ represents a substituted or unsubstituted tri- or more valent organic group having an aliphatic hydrocarbon group, an aromatic ring, or a heteroring; Z each independently represents a single bond or an oxygen atom; "k" represents an integer of 2 or more; "k" represents an attachment point, and an order of the repeating unit "l" and the repeating unit "m" may be any, (2)

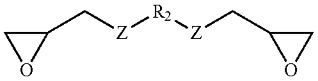

wherein $R_2$ and Z are same as above, (3)

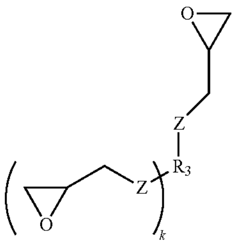

wherein $R_3$, Z, and "k" are same as above, (4)

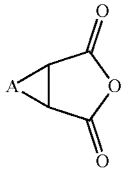

wherein A is same as above, and amounts of the bifunctional epoxy resin, the tri- or more functional epoxy resin, and the saturated acid anhydride are such that a ratio of a total number of moles of epoxy groups in the bifunctional epoxy resin and the tri- or more functional epoxy resin to a number of moles of the saturated acid anhydride is 1.30 to 3.00, and such that a number of moles of the bifunctional epoxy resin relative to a total number of moles of the bifunctional epoxy resin and the tri- or more functional epoxy resin is 0.001 to 0.15.

Such an adhesive composition is a highly reliable epoxy-resin-based adhesive composition that has a low viscosity, curability at low temperature, and high adhesiveness, and that can retain the power generation performance of the perovskite solar cell before and after sealing.

In this case, the reaction product is preferably a polymer polymerized with the bifunctional epoxy resin, the tri- or more functional epoxy resin, and the saturated acid anhydride, and a weight-average molecular weight of the polymer is preferably 2000 to 20000.

Such an adhesive composition makes the effect of the present invention more preferable.

In the present invention, the adhesive composition preferably further comprises, as the component (A), a reaction product represented by the following general formula (5) in which the compound represented by the general formula (1) is reacted with an alkoxysilane compound represented by the following general formula (6) or a partially hydrolyzed product thereof, (5)

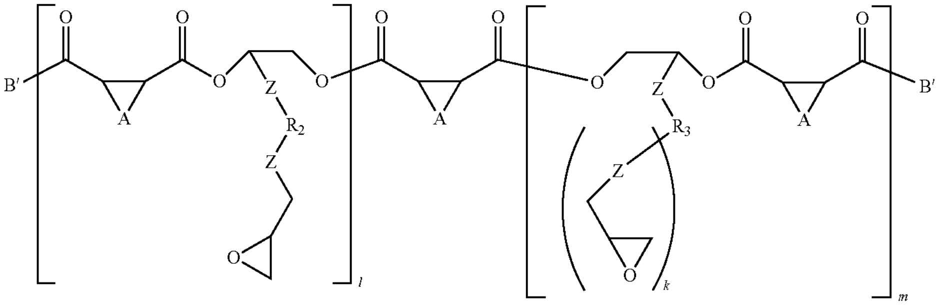

(5a)

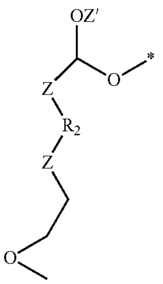

(5b)

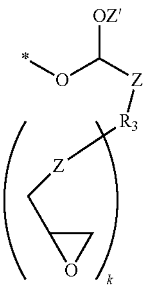

(6)

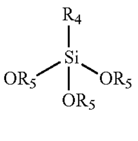

wherein A, $R_2$, $R_3$, Z, "k", and "*" are same as above; B' each independently represents a group represented by the general formula (5a) or the general formula (5b); Z' each independently represents $R_4(OR_5)_2Si—$ or a group derived from the partially hydrolyzed product of the alkoxysilane compound represented by the general formula (6); $R_4$ represents a monovalent organic group having a vinyl group, a styryl group, an acryl group, a methacryl group, an amino group, a mercapto group, a ureido group, or an isocyanate group; and $R_5$ represents a monovalent organic group having a methyl group, an ethyl group, a propyl group, or an isopropyl group.

Such an adhesive composition can achieve high adhesiveness to a substrate such as glass.

In the present invention, the bifunctional epoxy resin is preferably a BisA epoxy resin represented by the following general formula (2'), the tri- or more functional epoxy resin is preferably a triazine-ring trifunctional epoxy resin represented by the following general formula (3'), and the saturated acid anhydride is preferably a saturated-hydrocarbon acid anhydride represented by the following general formula (4'), Dimethylformamide and/or dimethyl sulfoxide as the residual solvent contained in the adhesive layer at 5000 ppm or less does not particularly adversely affect J-V characteristics.

Advantageous Effects of Invention

The inventive adhesive composition and film-shaped sealing material can be used for an adhesive, sticky, transparent adhesive and adhesive film, etc., and can be widely used in the paint field, the electric field, the automobile field, the building and building material fields, etc. It exhibits excellent characteristics specifically of curability at low temperature compared with conventional transparent resins. These characteristics achieve the curability at low temperature with which the conventional transparent resin system cannot be used and retain the power generation performance of the perovskite solar cell before and after sealing, thereby it can be suitably used.

DESCRIPTION OF EMBODIMENTS

The present inventors have made earnest study to solve the conventional disadvantages, and consequently achieve (2')

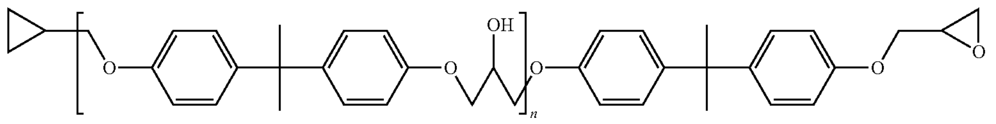

wherein "n" represents an integer of 1 or more.

(3')

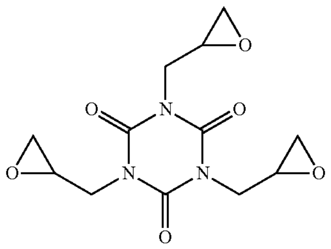

(4')

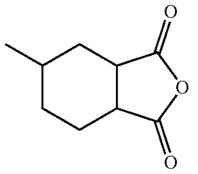

Such an adhesive composition makes the effect of the present invention further more preferable.

The present invention also provides a film-shaped sealing material comprising a dried solid of the above adhesive composition.

Such a film-shaped sealing material can impart good performance of retaining the power generation performance of the perovskite solar cell before and after sealing.

The film-shaped sealing material preferably further comprises a residual solvent, wherein the residual solvent is dimethylformamide and/or dimethyl sulfoxide, and a residual amount thereof per mass of the film-shaped sealing material is 5000 ppm or less.

improvement of adhesiveness by not only the reaction form of the epoxy resin and the saturated hydrocarbon acid anhydride but also containing, for example, a triazine-ring-containing trifunctional epoxy resin to add a predetermined amount of the triazine-ring-containing trifunctional epoxy resin into a BisA epoxy resin to construct a three-dimensional polymer structure. Forming a film-shaped composition with further reduced viscosity has been achieved by blending an excessive epoxy content relative to the saturated hydrocarbon acid anhydride to produce an oligomer. In addition, the film-shaped composition has been obtained by blending excessive epoxy content relative to the saturated hydrocarbon acid anhydride with a predetermined range. To achieve high adhesiveness to glass, a partially hydrolyzed product of an alkoxysilane is blended. From the above, the present inventors have found that the inventive epoxy resin adhesive composition (film-shaped adhesive composition) has characteristics of imparting a low viscosity, high adhesiveness, curability at low temperature, and good performance of retaining the power generation performance of the perovskite solar cell. This finding has led to complete the present invention.

Specifically, the present invention is an adhesive composition comprising:

a reaction product (A) among a bifunctional epoxy resin represented by the following general formula (2), a tri- or more functional epoxy resin represented by the following general formula (3), and a saturated acid anhydride represented by the following general formula (4);

a UV-sensitive reaction initiator (B); and a dilution solvent (C), wherein the component (A) is a compound represented by the following general formula (1), (1)

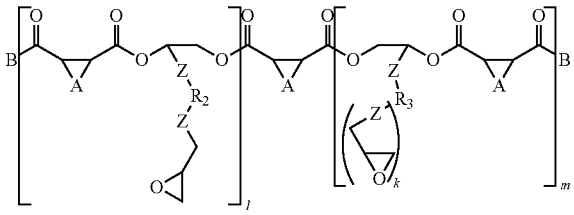

(1a)

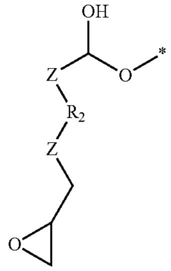

(1b)

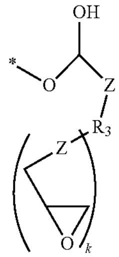

wherein A represents a saturated divalent hydrocarbon group; B each independently represents a group represented by the general formula (1a) or the general formula (1b); $R_2$ represents a substituted or unsubstituted divalent organic group having an aliphatic hydrocarbon group, an aromatic ring, or a heteroring; $R_3$ represents a substituted or unsubstituted tri- or more valent organic group having an aliphatic hydrocarbon group, an aromatic ring, or a heteroring; Z each independently represents a single bond or an oxygen atom; "k" represents an integer of 2 or more; "*" represents an attachment point, and an order of the repeating unit "l" and the repeating unit "m" may be any, (2)

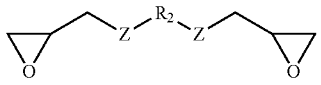

wherein $R_2$ and Z are same as above, (3)

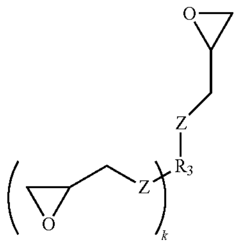

wherein $R_3$, Z, and "k" are same as above, (4)

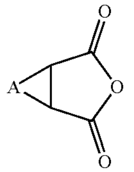

wherein A is same as above, and amounts of the bifunctional epoxy resin, the tri- or more functional epoxy resin, and the saturated acid anhydride are such that a ratio of a total number of moles of epoxy groups in the bifunctional epoxy resin and the tri- or more functional epoxy resin to a number of moles of the saturated acid anhydride is 1.30 to 3.00, and such that a number of moles of the bifunctional epoxy resin relative to a total number of moles of the bifunctional epoxy resin and the tri- or more functional epoxy resin is 0.001 to 0.15.

Hereinafter, the present invention will be described in detail, but the present invention is not limited thereto.

The present invention relates to a highly reliable epoxy-resin-based adhesive composition and film-shaped sealing material that have a low viscosity, curability at low temperature, high adhesiveness, and that retains power generation performance of a perovskite solar cell before and after sealing.

The inventive adhesive composition comprises: a specific reaction product (A) among a bifunctional epoxy resin, a tri- or more functional epoxy resin, and a saturated acid anhydride; a UV-sensitive reaction initiator (B); and a dilution solvent (C), wherein amounts of the bifunctional epoxy resin, the tri- or more functional epoxy resin, and the saturated acid anhydride are such that a ratio of a total number of moles of epoxy groups in the bifunctional epoxy resin and the tri- or more functional epoxy resin to a number of moles of the saturated acid anhydride is 1.30 to 3.00, and such that a number of moles of the bifunctional epoxy resin relative to a total number of moles of the bifunctional epoxy resin and the tri- or more functional epoxy resin is 0.001 to 0.15. The inventive adhesive composition can contain a component other than the components (A) to (C) as necessary. The inventive adhesive composition can be formed into a film (film-shaped adhesive composition).

Hereinafter, constituting components of the inventive adhesive composition will be described.

Component (A)

The component (A) is a reaction product among a bifunctional epoxy resin represented by the following general formula (2), a tri- or more functional epoxy resin represented by the following general formula (3), and a saturated acid anhydride represented by the following general formula (4). The component (A) is a compound represented by the following general formula (1).

(1)

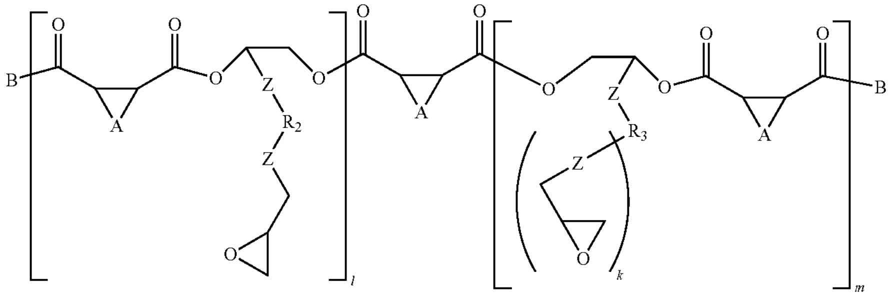

(1a)

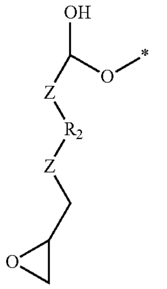

(1b)

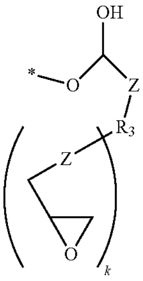

In the formulae, A represents a saturated divalent hydrocarbon group. B each independently represents a group represented by the general formula (1a) or the general formula (1b). $R_2$ represents a substituted or unsubstituted divalent organic group having an aliphatic hydrocarbon group, an aromatic ring, or a heteroring. $R_3$ represents a substituted or unsubstituted tri- or more valent organic group having an aliphatic hydrocarbon group, an aromatic ring, or a heteroring. Z each independently represents a single bond or an oxygen atom. "k" represents an integer of 2 or more. "*" represents an attachment point. An order of the repeating unit "l" and the repeating unit "m" may be any in the formula.

(2)

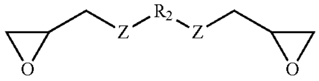

In the formula, $R_2$ and Z are same as above.

(3)

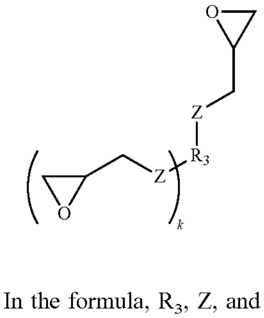

In the formula, $R_3$, Z, and "k" are same as above.

(4)

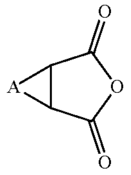

In the formula, A is same as above.

As above, the compound represented by the general formula (1) is a reaction product among the bifunctional epoxy resin, the tri- or more functional epoxy resin, and the saturated acid anhydride (saturated hydrocarbon acid anhydride), and has an epoxy residue of the bifunctional epoxy and an epoxy residue of the tri- or more functional epoxy in the skeleton.

In synthesis of the component (A), the specific compounds described later (the bifunctional epoxy resin, the tri- or more functional epoxy resin, and the saturated acid anhydride) are reacted such that amounts thereof are such that a ratio of a total number of moles of epoxy groups in the bifunctional epoxy resin and the tri- or more functional epoxy resin to a number of moles of the saturated acid anhydride is 1.30 to 3.00, and such that a number of moles of the bifunctional epoxy resin relative to a total number of moles of the bifunctional epoxy resin and the tri- or more functional epoxy resin is 0.001 to 0.15. In the general formula (1), "l" and "m" represent numbers satisfying the above requirements.

<Bifunctional Epoxy Resin>

The bifunctional epoxy resin used for the synthesis reaction of the compound represented by the general formula (1) is represented by the following general formula (2). Here, $R_2$ represents a substituted or unsubstituted divalent organic group having an aliphatic hydrocarbon group, an aromatic ring, or a heteroring. Z each independently represents a single bond or an oxygen atom.

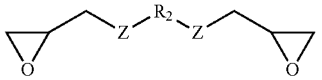

(2)

The epoxy resin used as the bifunctional epoxy resin (the general formula (2) component) in the present invention is a compound having two epoxy groups in the molecule. Specifically, the epoxy equivalent is preferably 50 to 5000 g/eq, and more preferably 100 to 500 g/eq.

The epoxy resin has a weight-average molecular weight of typically less than 10000, preferably 400 to 9000, and more preferably 500 to 8000.

The weight-average molecular weight (Mw) is a weight-average molecular weight in terms of standard polystyrene measured by gel permeation chromatography (GPC) (the same applies hereinafter).

Examples of such an epoxy resin include: diglycidyl ethers of bis(4-hydroxyphenyl)methane, 2,2'-bis(4-hydroxyphenyl)propane, or halogenated derivatives thereof, and condensation-polymerized products thereof (a so-called bisphenol F epoxy resin, bisphenol A epoxy resin, etc.); epoxides of dienes, such as butadiene diepoxide and vinylcyclohexene dioxide; epoxyglycidyl ethers obtained by condensation between dihydric phenols or dihydric alcohols, such as 1,2-dihydroxybenzene and resorcinol, and epichlorohydrin, such as diglycidyl ether of resorcin, 1,4-bis(2,3-epoxypropoxy)benzene, 4,4'-bis(2,3-epoxypropoxy)diphenyl ether, 1,4-bis(2,3-epoxypropoxy)cyclohexene, and bis(3,4-epoxy-6-methylcyclohexylmethyl) adipate; and polyglycidyl esters. Examples thereof also include divalent epoxy resins such as: epoxy novolacs (that is, novolac epoxy resins) obtained by condensation between novolac phenol resins (or halogenated novolac phenol resins) such as phenol novolac and cresol novolac and epichlorohydrin; an epoxidized polyolefin and epoxidized polybutadiene, which are epoxidized by a peroxide method; naphthalene-ring-containing epoxy resins; biphenyl epoxy resins; phenol aralkyl epoxy resins; biphenyl aralkyl epoxy resins; and cyclopentadiene epoxy resins.

Among these, preferable as the general formula (2) component are a bisphenol F epoxy resin and a bisphenol A epoxy resin that are liquid at a room temperature.

Commercial products can also be used as the general formula (2) component. Examples of the commercial product include JER-1001 (manufactured by Mitsubishi Chemical Corporation), which is the Bis A epoxy resin.

These epoxy resins can be used singly, or can be used as combination of two or more thereof.

<Tri- or More Functional Epoxy Resin>

The tri- or more functional epoxy resin used for the synthesis reaction of the compound represented by the general formula (1) is represented by the general formula (3). Here, $R_3$ represents a substituted or unsubstituted tri- or more valent functional organic group having an aliphatic hydrocarbon group, an aromatic ring, or a heteroring. Z each independently represents a single bond or an oxygen bond. "k" represents an integer of 2 or more, and preferably 2.

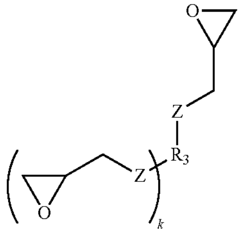

(3)

Examples of the tri- or more functional epoxy resin include glycidylamine epoxy resins, heterocyclic epoxy resins, and tri- or more functional aromatic or aliphatic epoxy resins. Examples of the heterocyclic epoxy resin include an epoxy resin having a heteroring such as a triazine skeleton. Examples of the tri- or more functional aromatic epoxy resin include an epoxy resin of a polyhydric phenol, and examples of the tri- or more functional aliphatic epoxy resin include an epoxy resin of a polyhydric alcohol.

(Glycidylamine Epoxy Resin)

Examples of the glycidylamine epoxy resin include: diaminodiphenylmethane epoxy resins such as, for example, tetraglycidyldiaminodiphenylmethane; diaminodiphenyl sulfone epoxy resins such as, for example, tetraglycidyldiaminodiphenyl sulfone; tetraglycidylmetaxylenediamine; tetraglycidyl-1,3-bisaminomethylcyclohexane; hydantoin epoxy resins; and aminophenol epoxy resins.

Specific examples of other glycidylamine epoxy resins include N,N,N',N'-tetraglycidyl-4,4'-diaminodiphenylmethane (trade name: Epotohto YH-434L, NIPPON STEEL Chemical & Material CO., LTD.), N,N,N',N'-tetraglycidyl-1,3-benzenedi(methaneamine) (trade name: TETRAD-X, MITSUBISHI GAS CHEMICAL COMPANY, INC.), 4-(glycidyloxy)-N,N-diglycidylaniline, and 3-(glycidyloxy)-N,N-diglycidylaniline.

These epoxy resins can be used singly, or can be used as combination of two or more thereof.

(Heterocyclic Epoxy Resin)

Examples of the heterocyclic epoxy resin preferably include a triazine-derivative epoxy resin such as a 1,3,5-triazine nucleus derivative epoxy resin. In particular, an epoxy resin having an isocyanurate ring has excellent light resistance and electric insulability. A resin having two epoxy groups on one isocyanurate ring is preferable, and a resin having three epoxy groups is more preferable. Specific examples of such a heterocyclic epoxy resin include triglycidyl isocyanurate (trade name: TEPIC-S, Nissan Chemical Industries, Ltd.)

(Tri- or More Functional Aromatic or Aliphatic Epoxy Resin)

Examples of the tri- or more functional aromatic or aliphatic epoxy resin include: epoxy novolacs (that is, novolac epoxy resins) obtained by condensation between novolac phenol resins (or halogenated novolac phenol resins) such as phenol novolac and cresol novolac and epichlorohydrin; an epoxidized polyolefin and epoxidized polybutadiene, which are epoxidized by a peroxide method; naphthalene-ring-containing epoxy resins; biphenyl epoxy resins; phenol aralkyl epoxy resins; biphenyl aralkyl epoxy resins; and cyclopentadiene epoxy resins. These epoxy resins have three or more epoxy groups in one molecule.

Furthermore, specific examples of the tri- or more functional aromatic epoxy resin include a tetrafunctional naphthalene epoxy resin (trade name: EPICLON HP-4700, DIC Corporation) and a triphenylmethane epoxy resin (trade name: 1032H60, Mitsubishi Chemical Corporation).

<Saturated Acid Anhydride>

The saturated acid anhydride used for the synthesis reaction of the compound represented by the general formula (1) is represented by the following general formula (4). Here, A represents a saturated divalent hydrocarbon group.

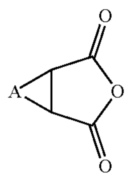

(4)

The acid anhydride that is a curing agent for the epoxy resin is not particularly limited as long as it is a saturated acid anhydride. Examples of the saturated acid anhydride include succinic anhydride, acid anhydrides of methylsuccinic acid, ethylsuccinic acid, 2,2-dimethylsuccinic acid, 3-oxabicyclo(3,1,0)hexa-2,4-dione, tetradecylsuccinic acid, hexadecylsuccinic acid, 2-octadecylsuccinic acid, hexahydrophthalic acids such as hexahydrophthalic acid, 3-methylhexahydrophthalic acid, 4-methylhexahydrophthalic acid, 3-ethylhexahydrophthalic acid, and 4-ethylhexahydrophthalic acid, bicyclo(2,2,2)octane-2,3-dicarboxylic anhydride, norcantharidin, and cantharidin.

Commercial products can also be used as the saturated acid anhydride. Examples of the commercial product include RIKACID MH (manufactured by New Japan Chemical Co., Ltd.).

These saturated acid anhydrides can be used singly, or can be used as combination of two or more thereof.

In the present invention, the compound represented by the general formula (1) (the compound (A)) is a reaction product among the bifunctional epoxy resin represented by the following general formula (2), the tri- or more functional epoxy resin represented by the following general formula (3), and the saturated acid anhydride represented by the following general formula (4).

The amounts of the bifunctional epoxy resin, the tri- or more functional epoxy resin, and the saturated acid anhydride are required such that a ratio of a total number of moles of epoxy groups in the bifunctional epoxy resin and the tri- or more functional epoxy resin (the number of moles of the total epoxy groups) to a number of moles of the saturated acid anhydride (the number of moles of the acid anhydride) ((the number of moles of the total epoxy groups)/(the number of moles of the acid anhydride)) is 1.30 to 3.00, and such that a number of moles of the bifunctional epoxy resin relative to a total number of moles of the bifunctional epoxy resin and the tri- or more functional epoxy resin (bifunctional epoxy resin proportion) is 0.001 to 0.15. Setting proportions of each component within such ranges can yield the highly reliable epoxy-resin-based adhesive composition and film-shaped sealing material having a low viscosity, curability at low temperature, and high adhesiveness, and retaining the power generation performance of the perovskite solar cell before and after sealing.

Meanwhile, (the number of moles of the total epoxy groups)/(the number of moles of the acid anhydride) of less than 1.30 may cause an unreacted curing agent to remain in the cured product to deteriorate humidity resistance of the obtained cured product, and may cause difficulty in solidification at a room temperature even with forming a prepolymer, which deteriorates adhesion strength after curing and considerably deteriorates the power generation performance. Meanwhile, (the number of moles of the total epoxy groups)/(the number of moles of the acid anhydride) of more than 3.00 may cause curing failure to deteriorate the reliability. The bifunctional epoxy resin proportion of less than 0.001 or more than 0.15 fails to construct the three-dimensional polymer structure to deteriorate adhesion strength after curing, and considerably deteriorates the power generation performance.

Examples for synthesizing the prepolymer include a method in which the aforementioned bifunctional epoxy resin, tri- or more functional epoxy resin, and saturated acid anhydride are mixed and reacted at 50 to 200° C., preferably 60 to 120° C., more preferably 70 to 110° C. for 1 to 20 hours, more preferably 2 to 15 hours. In addition, each component described later may be added to manufacture the target resin, and an order of adding the component may be any order. For example, when the bifunctional epoxy resin, the tri- or more functional epoxy resin, and the saturated acid anhydride are heated and mixed, a part of the tri- or more functional epoxy resin can be heated and mixed with the other components (first heating and mixing), and the residue of the tri- or more functional epoxy resin can be added into the obtained reaction product to be further heated and mixed (second heating and mixing) to obtain the target reaction product. In this case, temperatures, stirring times, stirring means, etc. may be different between the first heating and mixing and the second heating and mixing. The heating and mixing may be performed in the presence of a dilution solvent, described later.

The reaction product contained in the inventive adhesive composition is preferably a polymer polymerized with the bifunctional epoxy resin, the tri- or more functional epoxy resin, and the saturated acid anhydride, and a weight-average molecular weight of the polymer is preferably 2000 to 20000. The weight-average molecular weight of 2000 or more enables the adhesive composition to be formed into a film. The weight-average molecular weight of 20000 or less yields a preferable melt viscosity and sufficient adhesion force.

The weight-average molecular weight is a weight-average molecular weight in terms of standard polystyrene measured by GPC. Measurement conditions of the GPC are as follows.

Measurement Conditions

- Developing solvent: Tetrahydrofuran (THF)
- Flow rate: 0.6 mL/min
- Detector: Refractive index detector (RI)
- Column: TSK Guardcolumn SuperH-L
  - TSKgel SuperH4000 (6.0 mm I.D.×15 cm×1)
  - TSKgel SuperH3000 (6.0 mm I.D.×15 cm×1)
  - TSKgel SuperH2000 (6.0 mm I.D.×15 cm×2)
  - (All the above are manufactured by Tosoh Corporation.)
- Column temperature: 40° C.
- Injection amount of sample: 20 μL (THF solution at a concentration of 0.5 mass %)

<Alkoxysilane Compound and Partially Hydrolyzed Product of Alkoxysilane>

The inventive adhesive composition preferably further comprises, as the component (A), a reaction product represented by the following general formula (5) in which the compound represented by the general formula (1) is reacted with an alkoxysilane compound represented by the following general formula (6) or a partially hydrolyzed product thereof, (5)

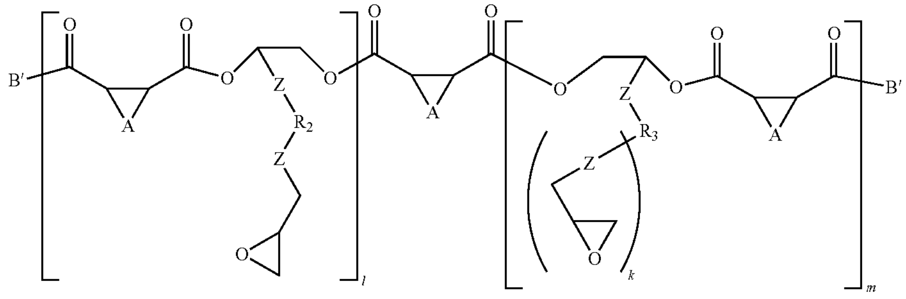

(5a)

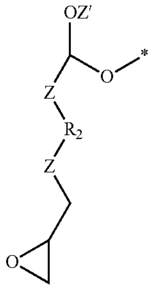

(5b)

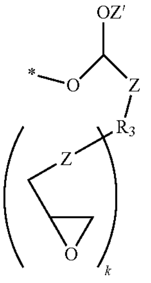

(6)

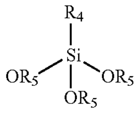

wherein A, $R_2$, $R_3$, Z, “k”, and “k” are same as above; B' each independently represents a group represented by the general formula (5a) or the general formula (5b); Z' each independently represents $R_4(OR_5)_2Si$— or a group derived from the partially hydrolyzed product of the alkoxysilane compound represented by the general formula (6); $R_4$ represents a monovalent organic group having a vinyl group, a styryl group, an acryl group, a methacryl group, an amino group, a mercapto group, a ureido group, or an isocyanate group; and $R_5$ represents a monovalent organic group having a methyl group, an ethyl group, a propyl group, or an isopropyl group.

The adhesive composition (or the film-shaped adhesive composition) containing the reaction product represented by the general formula (5) in which the alkoxysilane compound represented by the general formula (6) or a partially hydrolyzed product thereof (hereinafter, referred to as “alkoxysilane compound, etc.”) in addition to the compound represented by the general formula (1) can achieve high adhesiveness to glass, etc. because the alkoxysilane compound, etc. has a hydrolysable alkoxysilyl group.

The alkoxysilane or the partially hydrolytically condensed component of the alkoxysilane is a partially hydrolytically condensed product synthesized by a hydrolytic condensation reaction of the alkoxysilane containing at least one or two or more alkoxysilanes represented by the general formula (6). The partially hydrolytically condensed product has a weight-average molecular weight of 300 or more and 30000 or less and a residual alkoxy amount of 2 wt % or more and 50 wt % or less.

The partially hydrolytically condensed product synthesized by a hydrolytic condensation reaction of the alkoxysilane containing one or two or more alkoxysilanes represented by the general formula (6) refers to a silicone having three-dimensional mesh structure mainly composed of a trifunctional siloxane unit. The partially hydrolytically condensed product also includes, in addition to the partially hydrolytically condensed product directly synthesized by a hydrolytic condensation reaction of the alkoxysilane containing one or two or more alkoxysilanes represented by the general formula (6), a partially hydrolytically condensed product synthesized via a hydrolytic condensation reaction of the alkoxysilane containing one or two or more alkoxysilanes represented by the general formula (6) and by a further hydrolytic condensation reaction. The partially hydrolytically condensed product of the alkoxysilane represented by the general formula (6) is not particularly limited as long as it has the trifunctional siloxane unit.

Examples of the partially hydrolytically condensed product of the alkoxysilane containing the trifunctional alkoxysilane represented by the general formula (6) include: (i) products manufactured by Wacker Asahikasei Silicone Co., Ltd.: SY231 (having a methoxy group, a phenyl group, and a methyl group (alkoxy equivalent: 222)), SY550 (having a methoxy group, a phenyl group, and a methyl group), SY300 (having a hydroxy group, a phenyl group, and a propyl group (hydroxyl value: 3 wt %)), SY409 (having a hydroxy group, a phenyl group, and a methyl group (hydroxy value: 2.5 wt %)), SY430 (having a hydroxy group and a phenyl group (hydroxyl value: 5 wt %)), and IC836 (having a hydroxy group and a phenyl group (hydroxyl value: 3.5 wt %)); (ii) products manufactured by Shin-Etsu Chemical Co., Ltd.: straight silicone resins: KR220L (solid), KR242A, KR271, and KR282 (weight-average molecular weight (Mw)=100000 to 200000, having a hydroxy group (hydroxyl value: 1 wt %)), and KR300 and KR311 (Mw=6000 to 10000, having a hydroxy group (hydroxyl value: 4.5 wt %)), silicone intermediates: KC89 (having a methoxy group and a methyl group (methoxy group content: 45 wet %)), KR500 (having a methoxy group (methoxy group content: 30 wt %)), KR212 (Mw=2000 to 3000, having a hydroxy group, a methyl group, and a phenyl group (hydroxyl value: 5 wt %)), KR213 (having a methoxy group, a methyl group, and a phenyl group (methoxy group content: 22 wt %)), KR9218 (having a methoxy group, a methyl group, and a phenyl group (methoxy group content: 15 wt %)), KR251, KR400, KR255, KR216, and KR152; (iii) products manufactured by Dow Corning Toray Co., Ltd.: silicone resins: 804 RESIN (phenylmethyl type), 805 RESIN (phenylmethyl type), 806A RESIN (phenylmethyl type), 840 RESIN (phenylmethyl type), and SR2400 (methyl type), silicone intermediates: 3037 INTERMEDIATE (Mw=1000, having a methoxy group, a phenyl group, and a methyl group (methoxy group content: 18 wt %)), 3074 INTERMEDIATE (Mw=1400, having a methoxy group, a phenyl group, and a methyl group (methoxy group content: 17 wt %)), Z-6018 (Mw=2000, having a hydroxy group, a phenyl group, and a propyl group (hydroxyl value: 6 wt %)), 217 FLAKE (Mw=2000, having a hydroxy group and a phenyl group (hydroxyl value: 6 wt %)), 220 FLAKE (Mw=3000, having a hydroxy group, a phenyl group, and a methyl group (hydroxyl value: 6 wt %)), 233 FLAKE (Mw=3000, having a hydroxy group, a phenyl group, and a methyl group (hydroxyl value: 6 wt %)), 249 FLAKE (Mw=3000, having a hydroxy group, a phenyl group, and a methyl group (hydroxyl value: 6 wt %)), QP8-5314 (Mw=200, having a methoxy group, a phenyl group, and a methyl group (methoxy group content: 42 wt %)), SR2402 (Mw=1500, having a methoxy group and a methyl group (methoxy group content: 31 wt %)), AY42-161 (Mw=1500, having a methoxy group and a methyl group (methoxy group content: 36 wt %)), AY42-162 (Mw=2500, having a methoxy group and a methyl group (methoxy group content: 33 wt %)), and AY42-163 (Mw=4500, having a methoxy group and a methyl group (methoxy group content: 25 wt %)); and (iv) products manufactured by TOAGOSEI CO., LTD.: silsesquioxane derivatives, OX-SQ (having an oxetanyl group (functional group equivalent: 263 g/eq)), OX-SQ-H (having an oxetanyl group (functional group equivalent: 283 g/eq)), OX-SQSI-20 (having an oxetanyl group (functional group equivalent: 262 g/eq)), AC-SQ (having an acryloyl group (functional group equivalent: 165 g/eq)), and a partially hydrolytically condensed product of the alkoxysilane in which these partially hydrolytically condensed products of the alkoxysilane are subjected to a further hydrolytic condensation reaction.

In the inventive adhesive composition, the compound represented by the general formula (1) is preferably a reaction product among the following bifunctional epoxy resin, trifunctional epoxy resin, and saturated acid anhydride.

That is, the bifunctional epoxy resin is preferably a BisA epoxy resin represented by the following general formula (2'), the tri- or more functional epoxy resin is preferably a triazine-ring trifunctional epoxy resin represented by the following general formula (3'), and the saturated acid anhydride is preferably a saturated-hydrocarbon acid anhydride represented by the following general formula (4'). Specifically, the BisA epoxy resin can be JER-1001 (manufactured by Mitsubishi Chemical Corporation), the triazine-ring trifunctional epoxy resin can be TEPIC-S (manufactured by Nissan Chemical Corporation), and the saturated hydrocarbon acid anhydride can be RIKACID MH (manufactured by New Japan Chemical Co., Ltd.).

(2')

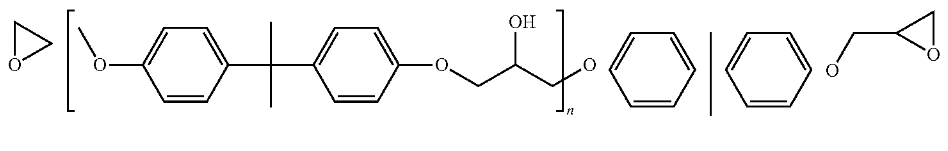

In the formula, "n" represents an integer of 1 or more.

(3')

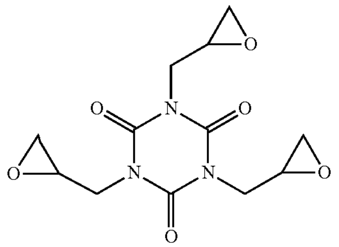

(4')

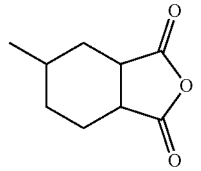

Component (B)

The inventive adhesive composition comprises the UV-sensitive reaction initiator as the component (B).

The present invention needs the UV-sensitive reaction initiator (photo-cation polymerization initiator), which is a compound to initiate polymerization of the resin by light. The compound is not particularly limited and any compound having such a function can be used. Preferable examples of the UV-sensitive reaction initiator include onium salts having a structure represented by the following formula (7). This onium salt is a compound reacted with light to release a Lewis acid.

$$\{R1_aR2_bR3_cR4_dY\}^{m+}\{MX_{n+m}\}^{m-} \quad (7)$$

In the formula (7), the cation is an onium ion; Y represents S, Se, Te, P, As, Sb, Bi, O, I, Br, Cl, or $N_2$ (diazo group); R1, R2, R3, and R4 represent organic groups that are identical to or different from each other; "a", "b", "c", and "d" each represent an integer of 0 to 3, and (a+b+c+d) equals a valency of Y.

Here, examples of the organic groups of R1 to R4 include: aryl groups, such as a phenyl group, a biphenyl group, and a naphthyl group; aryl groups mono-substituted or poly-substituted with an C1 to C18 alkyl group; a phenoxyphenyl group; and a thiophenylphenyl group.

M represents a metal or metalloid constituting a central atom of the halogenated complex $\{MX_{n+m}\}$, and examples thereof include B, P, As, Sb, Fe, Sn, Bi, Al, Ca, In, Ti, Zn, Sc, V, Cr, Mn, and Co. X represents a halogen atom such as, for example, F, Cl, and Br. "m" represents a net charge of the halogenated complex ion, and "n" represents an atomic valency of M.

In the formula (7), specific examples of the onium ion include diphenyliodonium, 4-methoxydiphenyliodonium, bis(4-methylphenyl)iodonium, bis(4-tert-butylphenyl)iodonium, bis(dodecylphenyl)iodonium, triphenylsulfonium, diphenyl-4-thiophenoxyphenylsulfonium, bis{4-(diphenylsulfonio)-phenyl} sulfide, bis{4-(di(4-(2-hydroxyethyl) phenyl)sulfonio)-phenyl} sulfide, and $\eta^5$-2,4-(cyclopentadiphenyl){1,2,3,4,5,6-η-(methylethyl)benzene} iron(1+).

In the formula (7), specific examples of the anion include tetrafluoroborate, hexafluorophosphate, hexafluoroantimonate, hexafluoroarsenate, and hexachloroantimonate. These UV-sensitive reaction initiators can be used singly, or can be used as combination of two or more thereof.

Commercial products can also be used as the UV-sensitive reaction initiator, and examples thereof include CPI-300, manufactured by San-Apro Ltd.

These UV-sensitive reaction initiators are preferably added within a range of 0.1 to 10 mass %, particularly 1 to 3 mass %, of the total amount of the organic components. The addition amount of 0.1 mass % or more yields good curability, and the addition amount of 10 mass % or less yields a good storage property with excellent curability.

Component (C)

The inventive adhesive composition comprises the dilution solvent as the component (C).

As the dilution solvent, an organic solvent is typically used. Examples of the organic solvent include: ketone solvents, such as acetone, methyl ethyl ketone (hereinafter, abbreviated as "MEK"), and cyclohexanone; acetate ester solvents, such as ethyl acetate, butyl acetate, cellosolve acetate, propylene glycol monomethyl ether acetate, and carbitol acetate; carbitol solvents, such as cellosolve and butyl carbitol; aromatic hydrocarbon solvents, such as toluene and xylene; aromatic ether solvents, such as anisole; amide solvents, such as dimethylformamide, dimethylacetamide, and N-methylpyrrolidone; sulfoxide solvents, such as dimethyl sulfoxide; and aromatic mixed solvents, such as solvent naphtha. Examples of the aromatic mixed solvent include "Swasol" (trade name, manufactured by Maruzen Petrochemical Co., Ltd.) and "Ipsol" (trade name, manufactured by Idemitsu Kosan Co., Ltd.). The solvent may be used singly, or may be used in combination of two or more thereof at any ratio.

Other Components

With the inventive adhesive composition, an alkoxysilane compound, etc., a thermal curing catalyst, an inorganic oxide fine particle, an oxidation inhibitor, a surfactant, a storage stabilizer, a leveling agent, and a light stabilizer can be blended as necessary.

Features of Adhesive Composition (Melt Viscosity)

The adhesive composition preferably has a melt viscosity of 5 to 500 mPa·s. The melt viscosity of 500 mPa·s or less yields sufficient adhesion force to the perovskite solar cell. The melt viscosity of 5 mPa·s or more facilitates removal of air in a recess during laminating to the perovskite solar cell with a roller, etc., which hardly cause voids.

The melt viscosity is measured by, for example, using a rheometer (HAAKE MARS II (manufactured by EKO INSTRUMENTS CO., LTD.)) with a 500-μm cap, a sample diameter of 8 mm, a heating rate of 10° C./min, and a frequency of 1 Hz within a range from 25° C. to 200° C.

(Curing Temperature)

A curing temperature of the adhesive composition is preferably 60° C. to 120° C. The curing temperature of 120° C. or lower yields sufficient power generation efficiency without braking of a perovskite layer. The curing temperature of 60° C. or higher enables to store the adhesive composition (film-shaped composition, etc.) at a normal temperature, which eliminates necessity of refrigerator or freezer storage. Dew condensation on the (film-shaped) adhesive composition due to refrigerator or freezer storage causes dissolution of the perovskite layer, but the above adhesive composition does not cause such a problem.

Film-Shaped Sealing Material

The inventive film-shaped sealing material comprises a dried solid of the above adhesive composition, and formed by evaporating the dilution solvent from the inventive adhesive composition to be dried up and solidified.

The inventive film-shaped sealing material can be used for an adhesive, sticky, transparent adhesive and adhesive film, etc., and can be widely used in the paint field, the electric field, the automobile field, the building and building material fields, etc. It exhibits excellent characteristics specifically of curability at low temperature compared with conventional transparent resins. These characteristics achieve the curability at low temperature with which the conventional transparent resin system cannot be used and retain the power generation performance of the perovskite solar cell before and after sealing, thereby it can be suitably used.

(Method for Producing Film-Shaped Sealing Material)

The film-shaped sealing material can be manufactured by a manufacturing method including forming a sealing material layer on a support. The sealing material layer can be formed by a method including: preparing an adhesive composition (varnish) containing a sealing material (adhesive) and a solvent; applying this varnish on the support; and drying (evaporating, drying, and solidifying) the applied varnish, for example.

The film-shaped sealing material can be manufactured as follows, for example.

A photoacid generator (UV-sensitive reaction initiator) is added into a 50%-anisole varnish of the aforementioned epoxy resin to obtain an anisole soliton of the epoxy resin. This anisole solution of the epoxy resin is applied by using a bar coater on a removable PET film surface-treated with a silicone remover. The PET film on which the epoxy resin adhesive is applied is dried (evaporated, dried, and solidified) with a dryer to obtain the epoxy film-shaped sealing material having an adhesive layer with a predetermined thickness.

For drying the varnish, a heating method, a hot-air blowing method, etc. can be used, for example. The drying condition is not particularly limited, and the temperature can be, for example, 50° C. to 100° C. The drying time is preferably 1 minute or longer, more preferably 3 minutes or longer, preferably 60 minutes or shorter, and more preferably 15 minutes or shorter. After the varnish is applied on the support, this applied varnish is dried for removing (evaporating) the solvent and dried and solidified to obtain the sealing material layer on the support.

The method for manufacturing the film-shaped sealing material may include heating the sealing material layer as necessary. Since heating can promote the reaction of the reactive group contained in the sealing material, the reactions such as the crosslinking reaction and the polymerization reaction can be promoted at an appropriate degree to increase a hardness of the sealing material layer. This heating is preferable when a sticky sealing material is used. In particular, when using a sticky sealing material containing a component having reactive groups such as an acid anhydride group and an epoxy group, the above heating is preferably performed. Such heating before sealing can avoid thermal deterioration of components contained in a sealing target. The heating conditions are not particularly limited. The heating temperature is preferably 50° C. to 200° C., more preferably 100° C. to 180° C., and further preferably 120° C. to 160° C. The heating time is preferably 15 minutes to 120 minutes, and more preferably 30 minutes to 100 minutes.

The method for manufacturing the film-shaped sealing material may include providing a protective film as necessary. The protective film can be provided by laminating the protective film and the sealing material layer, for example. When the sealing material layer is heated, the protective film may be provided before heating the sealing material layer, or may be provided after heating the sealing material layer.

Although the film-shaped sealing material may further include a residual solvent, the residual solvent in the film-shaped sealing material at a smaller amount is more preferable with considering characteristics of the sealing material. Those described as the dilution solvent can be the residual solvent. The residual amount per mass of the film-shaped sealing material is preferably 5000 ppm or less, further preferably 3000 ppm or less, and particularly preferably 1000 ppm or less. The residual solvent within such a range does not affect J-V characteristics of the perovskite solar cell.

The film-shaped sealing material preferably further includes a residual solvent, wherein the residual solvent is dimethylformamide (DMF) and/or dimethyl sulfoxide (DMSO), and a residual amount thereof per mass of the film-shaped sealing material is 5000 ppm or less. DMF and/or DMSO as the residual solvent contained in the adhesive layer at 5000 ppm or less does not particularly adversely affect the J-V characteristics.

(Use of Film-Shaped Sealing Material)

The above film-shaped sealing material can be used for sealing a sealing target such as the perovskite and an electrode. The sealing method using the film-shaped sealing material typically includes laminating the sealing material layer of the film-shaped sealing material to the sealing target. When the film-shaped sealing material has the protective film, the laminating is typically performed after the protective film is removed. The laminating method may be a batch method or a continuous method using a roller.

The laminating typically provides the sealing material layer and the support in this order on the sealing target. Thus, the sealing target after the laminating can be covered with the sealing material layer and the support. In the sealing method using the film-shaped sealing material, the support may not be removed to obtain a state where the sealing material layer and the support cover the sealing target. In this state, the sealing target is sealed with not only the sealing material layer but also the support, and thereby water entering can be effectively inhibited. For example, when using a film-shaped sealing material having a support having high moisture-permeation resistance, such as a support having a barrier layer and a support having a metal foil, the sealing is preferably performed with the sealing material layer and the support, as noted above.

As the sealing method using the film-shaped sealing material, the support may be removed after the laminating to obtain a state where the sealing material layer covers the sealing target, for example. This state can also effectively inhibit water entering with the sealing material layer sealing the sealing target. For example, when using a film-shaped sealing material having a support not having high moisture-permeation resistance, such as a support not having a barrier layer and a support not having a metal foil, the sealing is preferably performed with the sealing material layer as noted above.

The sealing method using the film-shaped sealing material may further include providing a sealing substrate, for example. Particularly when the support is removed as above, an appropriate sealing substrate is preferably provided on a surface of the sealing material layer exposed by removing the support. As such a sealing substrate, a film same as the aforementioned support may be used, or a rigid plate, such as a glass plate, a metal plate, and a steel plate, may be used, for example. Providing the sealing substrate can further effectively inhibits water entering.

The sealing method using the film-shaped sealing material may include curing the sealing material layer after the laminating, for example. In typical, the sealing material layer is heated for promoting the reactions such as the crosslinking reaction and the polymerization reaction of the reactive groups contained in the sealing material to thermally cure the sealing material layer. This can increase adhesiveness between the sealing target and the sealing material and can increase mechanical strength of the sealing material layer, and thereby the sealing ability of the sealing material can be improved. Thus, water entering and lead leakage can be particularly effectively inhibited. Such thermal curing after the laminating is preferable when a thermally curable sealing material is used.

In the thermal curing, the sealing material layer is typically heated with an appropriate heat-treating apparatus. Examples of the heat-treating apparatus include a hot-air circulating oven, an infrared ray heater, a heat gun, and a high-frequency induction heater. In addition, a heat tool may be crimped with the sealing material layer to heat the sealing material layer, for example. From the viewpoint of an increase in the adhesiveness between the sealing target and the sealing material layer, the curing temperature is preferably 50° C. or higher, more preferably 55° C. or higher, and particularly preferably 60° C. or higher. From the viewpoint of inhibition of thermal deterioration of components contained in the sealing target, the curing temperature is preferably 150° C. or lower, more preferably 100° C. or lower, and further preferably 80° C. or lower. The curing time is preferably 10 minutes or longer, and more preferably 20 minutes or longer.

The sealing with the sealing material layer is achieved by any of the aforementioned sealing methods. Thus, when the sealing target has a lead-containing part, such as the perovskite layer, not only water entering the lead-containing part but also leakage of lead from the lead-containing part can be inhibited.

The inventive adhesive composition and film-shaped sealing material, which are photocurable as described later, do not need heating for curing (for example, 60 to 120° C./60 sec), but heating may be performed as necessary so that the inventive adhesive composition and film-shaped sealing material are transferred to a substrate (such as glass). Softening with heating enables to adhere to the target substrate (such as glass), and then the temperature can be returned to a normal temperature to remove the support film. The transferring temperature with the target substrate is, for example, 60 to 120° C., and preferably 80° C. to 100° C. The transferring time is 10 to 180 seconds, and preferably 30 to 120 seconds. Subsequently, curing can be performed by light irradiation.

The inventive adhesive composition and film-shaped sealing material, which include the UV-sensitive reaction initiator, are photocurable. For example, the curing can be performed by light irradiation even at a low temperature of around a room temperature (25° C.) Conditions for the photocuring are set according to the components in the composition, such as the UV-sensitive reaction initiator, and the low-temperature curing can be performed by ultraviolet ray irradiation at 365 nm with 460 $mW/cm^2$ and 3000 $mJ/cm^2$, for example. The irradiation condition for the photocuring is, for example, 200 to 3000 $mW/cm^2$, and preferably 300 to 1000 $mW/cm^2$.

The inventive adhesive composition and film-shaped sealing material are cured at low temperature to exhibit good adhesion force (adhesion strength). The adhesion strength can be evaluated as follows.

First, the adhesive composition (epoxy resin composition) is prepared. The epoxy resin composition is applied on a PET film (LS-2, manufactured by NIPPA Co., Ltd.) having a thickness of 50 μm with a mold-releasing agent so that a thickness of the composition is 20 μm, and dried at 100° C. for 10 minutes for evaporating the solvent to obtain a bilayer film of the PET-epoxy resin composition. Subsequently, an alumina substrate is covered with the bilayer film of the PET-epoxy resin composition so as to be opposite to the epoxy resin composition side, and pressurized (0.1 atm) with heating (60° C. and 120° C., 60 sec each) with a vacuum laminator to achieve adhesion between the epoxy resin composition and the alumina substrate. After cooling to a room temperature, the PET film is removed to expose the layer of the epoxy resin composition.

On the epoxy resin composition layer, five glass pieces with 5 mm×5 mm×1 mm on each side are placed, and then irradiated with ultraviolet light (365 nm, 460 $mW/cm^2$) for curing to produce a specimen for adhesiveness. The produced specimen for adhesiveness is subjected to a measurement of an adhesion force (adhesion strength) with cutting by using a die bond tester (apparatus name: DageSeries4000 Bondtester, test speed: 200 μm/s, test height: 10.0 μm, and measurement temperature: 25° C.)

EXAMPLE

Hereinafter, the present invention will be specifically described with showing Examples and Comparative Example, but the present invention is not limited to the following Examples. In the following examples, “part” indicates “part by mass”. In synthesis examples, “(number of moles of total epoxy groups)/(number of moles of acid anhydride)” is a ratio of a total number of moles of epoxy groups in a bifunctional epoxy resin and a tri- or more functional epoxy resin (number of moles of total epoxy groups) to a number of moles of a saturated acid anhydride (number of moles of acid anhydride), and “bifunctional epoxy resin proportion” is a value of (number of moles of the bifunctional epoxy resin)/[(number of moles of the bifunctional epoxy resin)+(number of moles of the tri- or more functional epoxy resin)].

Examples 1 to 3 and Comparative Example 1

Synthesis Example 1

Into a 1-L separable flask equipped with a 25-ml water-quantitating receiver with a cock linked with a reflux cooler, a thermometer, and a stirrer, 19.70 parts of a BisA epoxy resin JER-1001 (manufactured by Mitsubishi Chemical Corporation), 31.89 parts of a triazine-ring trifunctional epoxy resin TEPIC-S (manufactured by Nissan Chemical Corporation), and 48.41 parts of RIKACID MH (manufactured by New Japan Chemical Co., Ltd.) were added, and the mixture was stirred for a reaction at 90° C. for 150 minutes to synthesize an epoxy-rich polymer. Into this, 100 parts of anisole was added to produce an epoxy-anisole solution. The (number of moles of total epoxy groups)/(number of moles of acid anhydride) was 1.27, and the bifunctional epoxy resin proportion was 0.17.

Synthesis Example 2

Into a 1-L separable flask equipped with a 25-ml water-quantitating receiver with a cock linked with a reflux cooler, a thermometer, and a stirrer, 1.45 parts of a BisA epoxy resin JER-1001 (manufactured by Mitsubishi Chemical Corporation), 30.27 parts of a triazine-ring trifunctional epoxy resin TEPIC-S (manufactured by Nissan Chemical Corporation), and 48.91 parts of RIKACID MH (manufactured by New Japan Chemical Co., Ltd.) were added, and the mixture was stirred for a reaction at 90° C. for 150 minutes to synthesize an epoxy-rich polymer. Thereafter, 19.37 parts of TEPIC-S (manufactured by Nissan Chemical Corporation) was added again, and then 100 parts of anisole was added to produce an epoxy-anisole solution. The (number of moles of total epoxy groups)/(number of moles of acid anhydride) was 1.73, and the bifunctional epoxy resin proportion was 0.096.

Synthesis Example 3

Into a 1-L separable flask equipped with a 25-ml water-quantitating receiver with a cock linked with a reflux cooler, a thermometer, and a stirrer, 1.45 parts of a BisA epoxy resin JER-1001 (manufactured by Mitsubishi Chemical Corporation), 49.64 parts of a triazine-ring trifunctional epoxy resin TEPIC-S (manufactured by Nissan Chemical Corporation), and 48.91 parts of RIKACID MH (manufactured by New Japan Chemical Co., Ltd.) were added, and the mixture was stirred for a reaction at 90° C. for 150 minutes to synthesize an epoxy-rich polymer. Added again were 19.37 parts of TEPIC-S (manufactured by Nissan Chemical Corporation) and then 100 parts of anisole. Thereafter, into this epoxy-rich polymer, 0.3 parts of KBM-803 (3-mercaptopropyltrimethoxysilane: manufactured by Shin-Etsu Chemical Co., Ltd.) was added, and the mixture was stirred for a reaction at 75° C. for 120 minutes to synthesize an alkoxysilane-added epoxy-rich polymer. Into this, 100 parts of anisole was added to produce an epoxy-anisole solution. The (number of moles of total epoxy groups)/(number of moles of acid anhydride) was 2.41, and the bifunctional epoxy resin proportion was 0.069.

Production Example 1

A perovskite solar cell was produced by the following method.

$MAPbI_3$·DMF Complex

A solution in which $PbI_2$ (2,305 g, 5.0 mmol) and methylammonium iodide (MAI; $CH_3NH_3I$; 795 mg, 5.0 mmol) were dissolved in dimethylformamide (DMF; 5.0 mL, corresponding to $MAPbI_3$; 1.0 M) was poured into a screw tube. As a cushioning layer, several drops of DMF were placed on the solution along a wall of the screw tube. A poor solvent (toluene) was slowly added thereon to be a volume ratio between the DMF layer and the poor solvent layer of 1:1, and a lid of the container is closed to be left to stand at a room temperature. The solvents were diffused in approximately one day to generate a colorless needle crystal. The crystal was collected by filtering, and dried under a reduced pressure at a room temperature for 20 minutes to obtain 3.167 g of a needle crystal (94% yield).

A 1.55-M DMF solution in which the DMF solution of the crystal obtained as above (the solution before filtering and drying) and MAI were dissolved at a mole ratio of 1:1 was applied on a mesoporous $TiO_2$ layer at 200 μL (per 2.5 cm square electrode) with spin-coating, and 3 seconds before the finishing, 450 μL of toluene was added within 2 seconds. Immediately after that, the obtained transparent film was heated at 100° C. or lower for 30 minutes, and then heated (anneal-treated) at 100° C. for 30 minutes to obtain $MAPbI_3$, which was a highly pure perovskite material.

Precursor Solution:

The $MAPbI_3$·DMF complex (1040 mg, 1.5 mmol) obtained in Production Example 1 was weighed, and dried under a reduced pressure of 30 mmHg at 60° C. for 4 hours. Thereafter, the obtained complex was fed into 1 mL of DMSO and stirred for 2 minutes to be dissolved.

Solar cell characteristics of a perovskite solar cell obtained by using the above precursor solution were measured.

Perovskite Solar Cell

A patterned transparent conductive glass substrate (FTO, 25 mm×25 mm, Asahi Glass Co., Ltd., Japan) was washed with ultrasonic wave in a 1 mass % aqueous solution of a neutral detergent, acetone, 2-propanol, and distilled water in this order for each 10 minutes. The glass substrate was finally subjected to a UV-ozone washing for 15 minutes.

Into 39 mL of ethanol (Wako, super-dehydrated), 1 mL of a 75 mass % 2-propanol solution of titanium di(isopropoxide) bis(acetylacetonato) ($Ti(OiPr)_2(acac)_2$; Tokyo Chemical Industry Co., Ltd., Japan) was added. The above FTO substrate (transparent electrode) was provided on a hot plate at 450° C., and the $Ti(OiPr)_2(acac)_2$ solution was sprayed (carrier gas: $N_2$, 0.5 MPa) to produce a compact $TiO_2$ layer (approximately 30 nm thick). Furthermore, the obtained substrate was immersed in 100 mL of an aqueous solution of $TiCl_4$ (440 μL, special grade, Wako Pure Chemical Industries Ltd., Japan) at 70° C. for 30 minutes. Thereafter, the substrate was calcined at 500° C. for 20 minutes to form a (positive hole) blocking layer.

On the obtained compact $TiO_2$ layer ((positive hole) blocking layer), approximately 190 μL (per 2.5 cm square electrode) of an ethanol solution of a $TiO_2$ paste (PST-18NR, manufactured by JGC Catalysts and Chemicals Ltd.) (paste: ethanol=1:8 (mass ratio)) was applied with spin-coating to form a mesoporous $TiO_2$ layer (electron transporting layer) having a thickness of approximately 100 to 150 nm.

The substrate with the produced mesoporous $TiO_2$ layer (electron transporting layer) that had been subjected to a UV-ozone treatment immediately thereafter was placed in a glove box. Prepared was a solution in which a mixed solvent of DMF and DMSO (3:1, by volume) was added into a mixture of $PbI_2$ and MAI at 1:1 (mole ratio) so that the concentration of the complex was 1.5 M. After MAI was added and dissolved, this solution was applied on the mesoporous $TiO_2$ layer (electron transporting layer) at approximately 250 μL (per 2.5 cm square electrode), spin-coating was performed, and 0.5 mL of toluene was dropped during this time to obtain a transparent film (spinning was performed at 5000 rpm with slope for 5 seconds, spin-coating for 5 seconds was performed, toluene was dropped within the last 1 second of spin-coating, and the spinning was terminated with slope for 5 seconds). The obtained film was annealed at 40° C. for 5 minutes, at 55° C. for 5 to 30 minutes, then at 75° C. for 5 minutes, and subsequently at 100° C. for 30 minutes to produce a plane and dense perovskite layer having a thickness of approximately 500 nm.

A positive hole transporting material (Spiro-OMeTAD; 2,2',7,7'-tetrakis(N,N-di-p-methoxyphenylamine)-9,9'-spirobifluorene, 61.3 mg, 0.050 M), [tris(2-(1H-pyrazol-1-yl)-4-tert-butylpyridine) cobalt (III) tris(bis(trifluoromethylsulfonyl)imide)] (FK209; 11.3 mg, 0.0075 M), 4-tert-butylpyridine (TBP; 24.4 μL, 0.165 M, Aldrich), and lithium bis(trifluoromethylsulfonyl)imide (LITFSI; 7.6 mg, 0.027 M, Wako Pure Chemical Industries Co., Ltd.) were dissolved in 1 mL of chlorobenzene. After the solution was stirred for 30 minutes, the solution was filtered with a membrane filter, and the filtrate was applied on the perovskite layer with spin-coating. The obtained substrate was annealed at 70° C. for 30 minutes to form a positive hole transporting layer (approximately 200 nm thick), and then a gold electrode with 80 nm was attached on the positive hole transporting layer by vacuum deposition to obtain a perovskite solar cell.

A method for producing an epoxy film-shaped sealing material and an epoxy-resin-sealed perovskite solar cell specimen, and methods for measuring a viscosity and an adhesion force (adhesion strength) were as follows.

Method for Producing Epoxy Film-Shaped Sealing Material

Into 200 parts of the aforementioned 50% anisole varnish of the epoxy resin, 2.5 parts of CPI-300, manufactured by San-Apro Ltd., was added, and the epoxy resin-anisole solution was applied by using a bar coater on a removable PET film surface-treated with a silicone remover. The PET film coated with the epoxy resin adhesive was dried under conditions at 100° C. for 10 minutes with a dryer to obtain an epoxy film-shaped sealing material (adhesive) having the adhesive layer with 20 μm.

Method for Producing Epoxy-Resin-Sealed Perovskite Solar Cell Specimen

The aforementioned epoxy film-shaped sealing material was vacuum-laminated onto the perovskite solar cell specimen at 80 or 100° C. for 60 seconds, and then irradiated at a room temperature (25° C.) with UV-LED at 365 nm, 460 $mW/cm^2$ and 3000 $mJ/cm^2$ to obtain the inventive epoxy-resin-sealed perovskite solar cell specimen.

Method for Measuring Viscosity

A viscosity of the varnish (epoxy-anisole solution) obtained in Synthesis Example was measured in a thermostatic water bath at 25° C. with an Ostwald viscometer.

Adhesion Strength

Each of the epoxy resin compositions (epoxy-anisole solutions) obtained in Synthesis Examples 1 to 3 was dissolved in anisole solvent so that a solid content rate was 50%, the solution was applied with a thickness of 25 μm on a PET film coated with a fluorinated silicone with a bar coater, and the solvent was evaporated at 100° C. for 10 minutes to obtain an adhesive layer with 20 μm in thickness. This was attached to a quartz piece with 5 mm×5 mm×725 μm at 100° C. for 60 seconds, and then sandwiched with a glass specimen with 30 mm×75 mm×2 mm so as to be the quartz layer-epoxy layer-glass layer, crimped at 100° C. and 6 $kgf/cm^2$ for 60 seconds, and irradiated at a room temperature (25° C.) with a UV-LED at 365 nm with 460 $mW/cm^2$ and 3000 mJ/cm 2 to cure the epoxy resin layer. A specimen for adhesion was manufactured as above. Thereafter, a shearing adhesion force was measured by using a Dage4000 adhesion tester, manufactured by Dage Corporation, at a rate of 0.5 mm/min.

Method for Evaluating J-V Characteristics

Photoelectric conversion characteristics of the perovskite solar cells of Examples and Comparative Example were measured by a method in accordance with a method for measuring an output of a crystalline solar cell, JIS C 8913:2005. An air mass filter of AM 1.5 G was combined with a solar simulator (OTENTO-SUN III, manufactured by Bunkoukeiki Co., Ltd., and a light quantity of a light source for the measurement was adjusted to 100 mW/$cm^2$ by using a standard solar cell.

In the actual measurement, the solar cell element masked so that the measurement area was 0.1 $cm^2$ was irradiated with light, and J-V curve characteristics were measured by using a source meter (2400 model, manufactured by Keithley Instruments). From the results, a short-circuit current (Jsc), an open-circuit voltage (Voc), a fill factor (FF), a series resistance (Rs), and a parallel resistance (Rsh) were derived. A photoelectric conversion efficiency (PCE) was calculated by the following formula. A PCE in the initial stage was determined on the above epoxy film-shaped sealing material, and a PCE after sealing was determined on the above epoxy-resin-sealed perovskite solar cell specimen.

$$PCE\ (\%)=(Jsc\ (mA/cm^2)\times Voc\ (V)\times FF/100\ (mW/cm^2))\times 100$$

Table 1 shows the results.

TABLE 1

| | Example 1 | Example 2 | Example 3 | Comparative Example 1 |
|---|---|---|---|---|
| Varnish in Synthesis Example 1 | | | | 200 |
| Varnish in Synthesis Example 2 | 200 | 200 | | |
| Varnish in Synthesis Example 3 | | | 200 | |
| CPI-300 | 2.5 | 2.5 | 2.5 | 2.5 |
| Anisole | 100 | 100 | 100 | 100 |
| Laminating condition | 80° C./60 sec in vacuo | 100° C./60 sec in vacuo | 100° C./60 sec in vacuo | 100° C./60 sec in vacuo |
| Viscosity (mPa · s) | 13 | 13 | 13 | 1000 |
| Adhesion strength (kgf/$cm^2$) | 37.2 | 37.2 | 40.4 | 3.4 |
| UV curing condition | UV-LED at 365 nm, 460 mW/$cm^2$, 3000 mJ/$cm^2$ | | | |
| PCE in initial stage | 17.98 | 18.68 | 18.34 | 17.53 |
| PCE after sealing | 16.48 | 15.06 | 16.52 | 7.02 |
| Decrease rate | 8.5% | 19.0% | 10.0% | 60.0% |

Examples 1 to 3, which used the film-shaped sealing materials obtained from the inventive adhesive compositions (the varnish of Synthesis Examples 2 and 3), exhibited the low viscosity of the composition, enabled to curing at low temperature, had excellent adhesiveness, and enabled to retain the power generation performance of the perovskite solar cell before and after the sealing. Meanwhile, Comparative Example 1, which had the (number of moles of total epoxy groups)/(number of moles of acid anhydride) of less than 1.30 and the bifunctional epoxy resin proportion of more than 0.15 and which did not correspond to the present invention, exhibited the high viscosity of the composition, exhibited poor adhesiveness, and the power generation performance of the perovskite solar cell after the sealing was considerably decreased.

The present invention encompasses the following embodiments.

[1] An adhesive composition, comprising:

a reaction product (A) among a bifunctional epoxy resin represented by the following general formula (2), a tri- or more functional epoxy resin represented by the following general formula (3), and a saturated acid anhydride represented by the following general formula (4);

a UV-sensitive reaction initiator (B); and a dilution solvent (C), wherein the component (A) is a compound represented by the following general formula (1), (1)

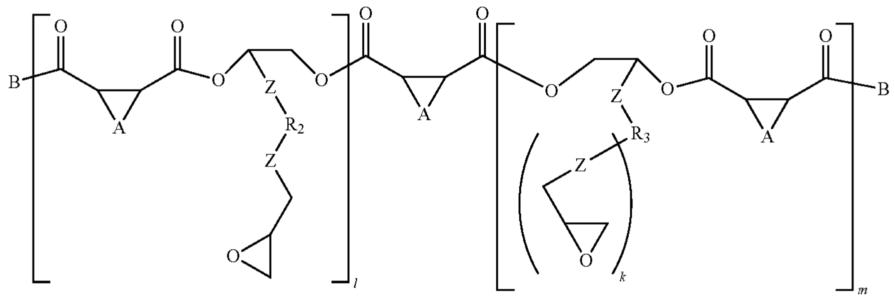

-continued (1a)

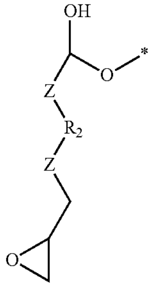

(1b)

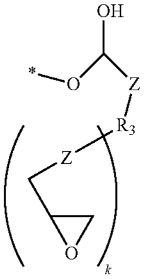

wherein A represents a saturated divalent hydrocarbon group; B each independently represents a group represented by the general formula (1a) or the general formula (1b); $R_2$ represents a substituted or unsubstituted divalent organic group having an aliphatic hydrocarbon group, an aromatic ring, or a heteroring; $R_3$ represents a substituted or unsubstituted tri- or more valent organic group having an aliphatic hydrocarbon group, an aromatic ring, or a heteroring; Z each independently represents a single bond or an oxygen atom; "k" represents an integer of 2 or more; "*" represents an attachment point, and an order of the repeating unit "l" and the repeating unit "m" may be any, (2)

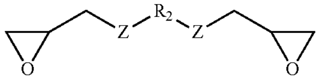

wherein $R_2$ and Z are same as above, (3)

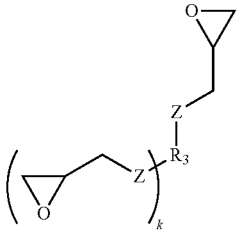

wherein $R_3$, Z, and "k" are same as above, (4)

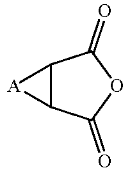

wherein A is same as above, and amounts of the bifunctional epoxy resin, the tri- or more functional epoxy resin, and the saturated acid anhydride are such that a ratio of a total number of moles of epoxy groups in the bifunctional epoxy resin and the tri- or more functional epoxy resin to a number of moles of the saturated acid anhydride is 1.30 to 3.00, and such that a number of moles of the bifunctional epoxy resin relative to a total number of moles of the bifunctional epoxy resin and the tri- or more functional epoxy resin is 0.001 to 0.15.

[2] The adhesive composition according to [1], wherein the reaction product is a polymer polymerized with the bifunctional epoxy resin, the tri- or more functional epoxy resin, and the saturated acid anhydride, and a weight-average molecular weight of the polymer is 2000 to 20000.

[3] The adhesive composition according to [1] or [2], wherein the adhesive composition further comprises, as the component (A), a reaction product represented by the following general formula (5) in which the compound represented by the general formula (1) is reacted with an alkoxysilane compound represented by the following general formula (6) or a partially hydrolyzed product thereof, (5)

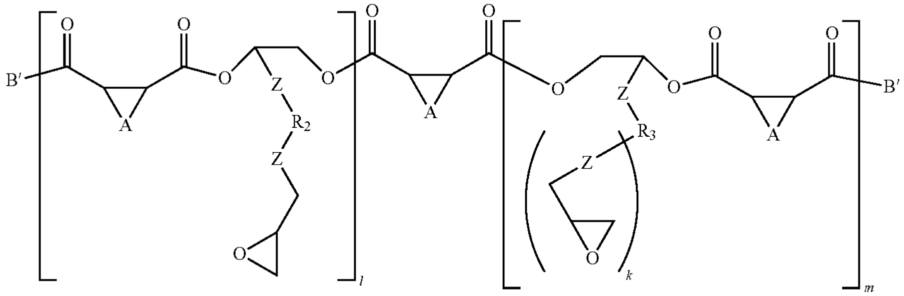

-continued (5a)

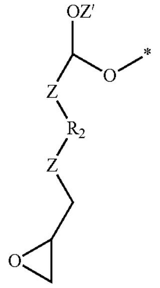

(5b)

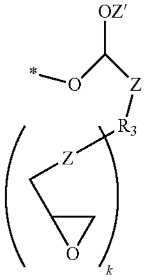

(6)

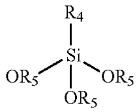

wherein A, $R_2$, $R_3$, Z, "k", and "*" are same as above; B' each independently represents a group represented by the general formula (5a) or the general formula (5b); Z' each independently represents $R_4(OR_5)_2$ Si— or a group derived from the partially hydrolyzed product of the alkoxysilane compound represented by the general formula (6); $R_4$ represents a monovalent organic group having a vinyl group, a styryl group, an acryl group, a methacryl group, an amino group, a mercapto group, a ureido group, or an isocyanate group; and $R_5$ represents a monovalent organic group having a methyl group, an ethyl group, a propyl group, or an isopropyl group.

[4] The adhesive composition according to any one of [1] to [3], wherein the bifunctional epoxy resin is a BisA epoxy resin represented by the following general formula (2'), the tri- or more functional epoxy resin is a triazine-ring trifunctional epoxy resin represented by the following general formula (3'), and the saturated acid anhydride is a saturated-hydrocarbon acid anhydride represented by the following general formula (4'), -continued (4')

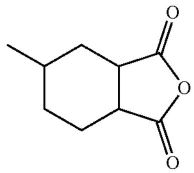

[5] A film-shaped sealing material, comprising a dried solid of the adhesive composition according to any one of [1] to [4].

[6] The film-shaped sealing material according to [5], further comprising a residual solvent, wherein the residual solvent is dimethylformamide and/or dimethyl sulfoxide, and a residual amount thereof per mass of the film-shaped sealing material is 5000 ppm or less.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

(2')

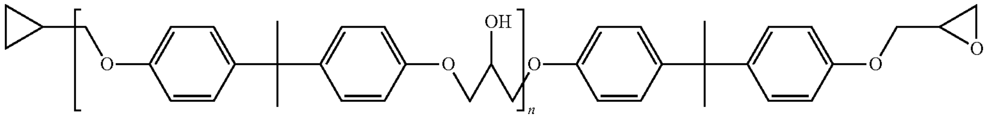

wherein "n" represents an integer of 1 or more.

(3')

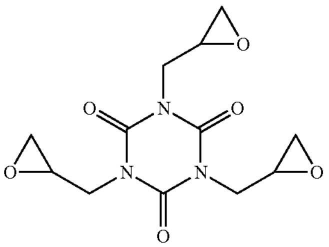

The invention claimed is:

1. An adhesive composition, comprising:

a reaction product (A) among a bifunctional epoxy resin represented by the following general formula (2), a tri- or more functional epoxy resin represented by the following general formula (3), and a saturated acid anhydride represented by the following general formula (4);

a UV-sensitive reaction initiator (B); and a dilution solvent (C), wherein the component (A) is a compound represented by the following general formula (1), wherein the adhesive composition further contains a reaction product represented by the following general formula (5) in which the compound represented by the general formula (1) is reacted with an alkoxysilane compound represented by the following general formula (6) or a partially hydrolyzed products thereof, (1)

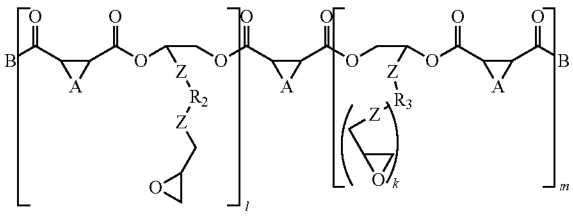

(1a)

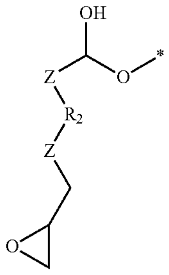

(1b)

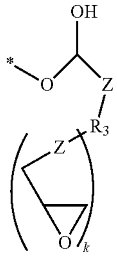

wherein A represents a saturated divalent hydrocarbon group; B each independently represents a group represented by the general formula (1a) or the general formula (1b); $R_2$ represents a substituted or unsubstituted divalent organic group having an aliphatic hydrocarbon group, an aromatic ring, or a heteroring; $R_3$ represents a substituted or unsubstituted tri- or more valent organic group having an aliphatic hydrocarbon group, an aromatic ring, or a heteroring; Z each independently represents a single bond or an oxygen atom; "k" represents an integer of 2 or more; "*" represents an attachment point, and an order of the repeating unit "1" and the repeating unit "m" may be any, (2)

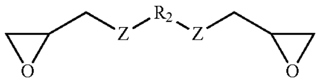

wherein $R_2$ and Z are same as above, (3)

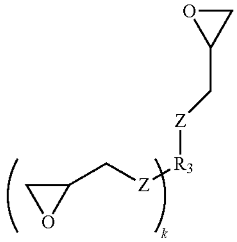

wherein $R_3$, Z, and "k" are same as above, (4)

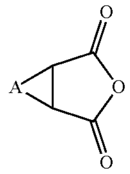

wherein A is same as above, and (5)

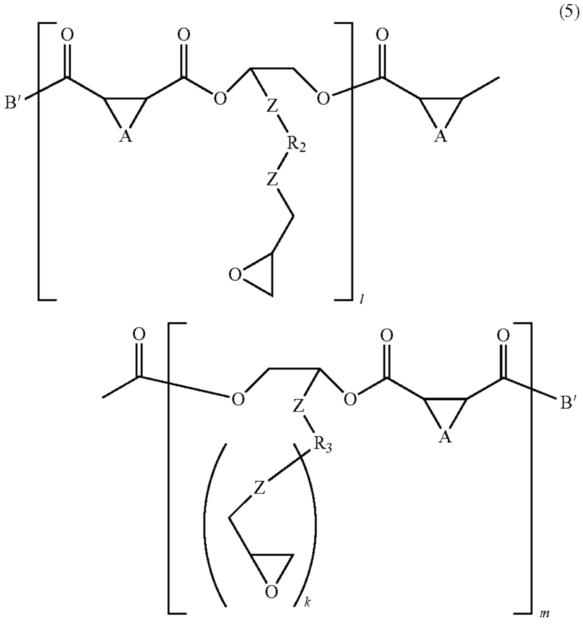

(5a)

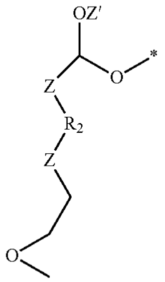

-continued (5b)

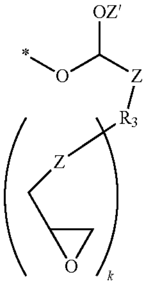

(6)

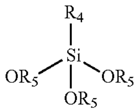

wherein A, $R_2$, $R_3$, Z, "k", and "are same as above; B' each independently represents a group represented by the general formula (5a) or the general formula (5b); Z' each independently represents $R_4(OR_5)2Si$— or a group derived from the partially hydrolyzed product of the alkoxysilane compound represented by the general formula (6); $R_4$ represents a monovalent organic group having a vinyl group, a styryl group, an acryl group, a methacryl group, an amino group, a mercapto group, a ureido group, or an isocyanate group; and $R_5$ represents a monovalent organic group having a methyl group, an ethyl group, a propyl group, or an isopropyl group; and wherein amounts of the bifunctional epoxy resin, the tri- or more functional epoxy resin, and the saturated acid anhydride are such that a ratio of a total number of moles of epoxy groups in the bifunctional epoxy resin and the tri- or more functional epoxy resin to a number of moles of the saturated acid anhydride is 1.30 to 3.00, and such that a number of moles of the bifunctional epoxy resin relative to a total number of moles of the bifunctional epoxy resin and the tri- or more functional epoxy resin is 0.001 to 0.15.

2. The adhesive composition according to claim 1, wherein the reaction product is a polymer polymerized with the bifunctional epoxy resin, the tri- or more functional epoxy resin, and the saturated acid anhydride, and a weight-average molecular weight of the polymer is 2000 to 20000, wherein the weight-average molecular weight is measured by gel permeation chromatography (GPC) in terms of polystyrene standard using a solvent of tetrahydrofuran.

3. The adhesive composition according to claim 1, wherein the bifunctional epoxy resin is a BisA epoxy resin represented by the following general formula (2'), the tri- or more functional epoxy resin is a triazine-ring trifunctional epoxy resin represented by the following general formula (3'), and the saturated acid anhydride is a saturated-hydrocarbon acid anhydride represented by the following general formula (4'), (2')

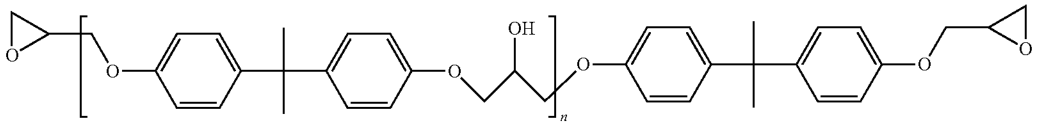

wherein "n" represents an integer of 1 or more (3')

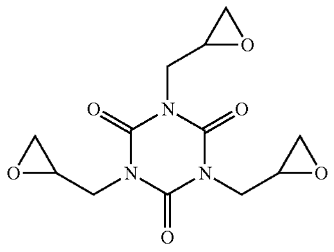

(4')

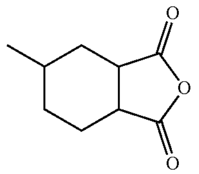

4. The adhesive composition according to claim 2, wherein the bifunctional epoxy resin is a BisA epoxy resin represented by the following general formula (2'), the tri- or more functional epoxy resin is a triazine-ring trifunctional epoxy resin represented by the following general formula (3'), and the saturated acid anhydride is a saturated-hydrocarbon acid anhydride represented by the following general formula (4'), (2')

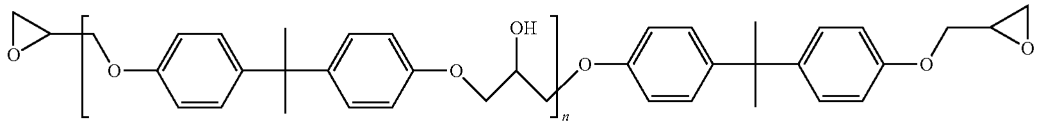

wherein "n" represents an integer of 1 or more (3')

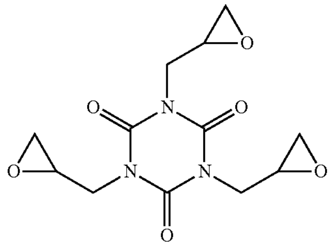

(4')

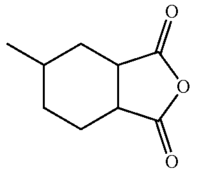

5. A film-shaped sealing material, comprising a dried solid of the adhesive composition according to claim 1.

6. A film-shaped sealing material, comprising a dried solid of the adhesive composition according to claim 2.

7. A film-shaped sealing material, comprising a dried solid of the adhesive composition according to claim 3.

8. The film-shaped sealing material according to claim 5, further comprising a residual solvent, wherein the residual solvent is dimethylformamide and/or dimethyl sulfoxide, and a residual amount thereof per mass of the film-shaped sealing material is 5000 ppm or less.

9. The film-shaped sealing material according to claim 6, further comprising a residual solvent, wherein the residual solvent is dimethylformamide and/or dimethyl sulfoxide, and a residual amount thereof per mass of the film-shaped sealing material is 5000 ppm or less.

10. The film-shaped sealing material according to claim 7, further comprising a residual solvent, wherein the residual solvent is dimethylformamide and/or dimethyl sulfoxide, and a residual amount thereof per mass of the film-shaped sealing material is 5000 ppm or less.

* * * * *